(12) United States Patent
Oomori et al.

(10) Patent No.: US 8,084,901 B2
(45) Date of Patent: Dec. 27, 2011

(54) POWER TOOL

(75) Inventors: Katsuhiro Oomori, Ibaraki (JP);
Yoshihiro Komuro, Ibaraki (JP);
Kenichirou Yoshida, Ibaraki (JP);
Kazutaka Iwata, Ibaraki (JP)

(73) Assignee: Hitachi Koki Co., Ltd., Tokyo (JP)

( * ) Notice: Subject to any disclaimer, the term of this patent is extended or adjusted under 35 U.S.C. 154(b) by 0 days.

(21) Appl. No.: 12/530,200

(22) PCT Filed: Jun. 17, 2008

(86) PCT No.: PCT/JP2008/061377
§ 371 (c)(1),
(2), (4) Date: Jan. 19, 2010

(87) PCT Pub. No.: WO2008/156185
PCT Pub. Date: Dec. 24, 2008

(65) Prior Publication Data
US 2010/0244592 A1 Sep. 30, 2010

(30) Foreign Application Priority Data

Jun. 18, 2007 (JP) ................................ 2007-159734

(51) Int. Cl.
*H02K 7/14* (2006.01)
(52) U.S. Cl. ........................................................ 310/50
(58) Field of Classification Search .................... 310/50; 173/117, 118
See application file for complete search history.

(56) References Cited

U.S. PATENT DOCUMENTS

| | | | | |
|---|---|---|---|---|
| 2,779,883 A | * | 1/1957 | Schumann | 310/50 |
| 3,818,255 A | * | 6/1974 | Wagner | 310/50 |
| 5,087,497 A | | 2/1992 | Suzuki et al. | |
| 5,939,807 A | * | 8/1999 | Patyk et al. | 310/89 |
| 6,123,158 A | * | 9/2000 | Steffen | 173/217 |
| 6,543,549 B1 | * | 4/2003 | Riedl et al. | 173/216 |
| 6,776,245 B2 | * | 8/2004 | Kristen et al. | 173/217 |
| 6,866,105 B2 | * | 3/2005 | Pfisterer et al. | 173/117 |
| 7,330,006 B2 | * | 2/2008 | Iwata et al. | 318/400.41 |
| 7,462,965 B2 | | 12/2008 | Natsuhara et al. | |
| 7,786,627 B2 | * | 8/2010 | Riedl | 310/50 |
| 2006/0208581 A1 | | 9/2006 | Ikuta et al. | |

FOREIGN PATENT DOCUMENTS

| | | |
|---|---|---|
| CN | 1542957 A | 11/2004 |
| CN | 1945936 A | 4/2007 |
| DE | 33 18 199 A1 | 11/1984 |

(Continued)

OTHER PUBLICATIONS

Notification of First Office Action, Intellectual Property Office of P.R.C. Aug. 4, 2010.

*Primary Examiner* — Quyen Leung
*Assistant Examiner* — Naishadh Desai
(74) *Attorney, Agent, or Firm* — Kimble Intellectual Property Law, PLLC

(57) ABSTRACT

According to an aspect of the present invention, there is provided a power tool including: a housing having a suction port formed thereon to introduce an cooling air from an outside of the housing; and a brushless motor that is housed in the housing and has an electric circuit, the electric circuit having a heat radiating surface, wherein the heat radiating surface is disposed in a neighborhood of the suction port.

12 Claims, 3 Drawing Sheets

FOREIGN PATENT DOCUMENTS

| | | |
|---|---|---|
| DE | 199 00 404 A1 | 7/2000 |
| EP | 0 107 629 A | 5/1984 |
| EP | 0 192 469 A | 8/1986 |
| EP | 0 873 824 A | 10/1998 |
| EP | 1 398 864 A | 3/2004 |
| EP | 1 398 865 A | 3/2004 |
| EP | 1 548 916 A | 6/2005 |
| EP | 1 715 565 A | 10/2006 |
| GB | 2 423 272 A | 8/2006 |
| JP | 11 300656 A | 11/1999 |
| JP | 2004-122343 A | 4/2004 |
| JP | 2004-357371 A | 12/2004 |
| JP | 2005-176451 A | 6/2006 |

* cited by examiner

// POWER TOOL

TECHNICAL FIELD

An aspect of the present invention relates to a power tool.

BACKGROUND ART

A brushless motor (DC motor) for use as motive power of a power tool can be reduced in size, and have a longer life, because there is no need for electrical connection to a rotor attached to the rotation shaft using a brush and a commutator. To drive the brushless motor, an inverter circuit board (motor drive circuit board) that is an electric circuit is required.

The inverter circuit board includes a switching element, and needs some cooling measures, because an output transistor of the switching element supplies a drive signal of large current to a stator coil and generates a large amount of heat. JP-A-2004-357371, JP-A-2005-176451 and JP-A-2004-122343 disclose a cooling structure for the inverter circuit board, in which a heat radiating member is fixed to the output transistor.

However, in these power tools, since heat generated in the output transistor is conveyed to the heat radiating member and radiated, conduction of heat is not made excellently if there is a gap between the output transistor and the heat radiating member, whereby the cooling performance may be degraded. In addition, since the output transistor is fixed by the heat radiating member, an urging force is applied to the output transistor. Generally, the output transistor is fixed on the board by three legs, but if the urging force is applied, the root of leg may be broken to cause a disconnection.

DISCLOSURE OF INVENTION

It is an object of the invention to provide a power tool securing the cooling performance without providing the heat individual radiating member.

According to an aspect of the present invention, there is provided a power tool including: a housing having a suction port formed thereon to introduce an cooling air from an outside of the housing; and a brushless motor that is housed in the housing and has an electric circuit, the electric circuit having a heat radiating surface, wherein the heat radiating surface is disposed in a neighborhood of the suction port.

By such a configuration, since the heat radiating surface is disposed in the neighborhood of the suction port so as to be supplied with the cooling air having a lower temperatures, the heat radiating portion can be suitably cooled.

The housing may further include: an exhaust port that is disposed in the housing to exhaust the cooling air to the outside of the housing; and an air passage that is formed in a space between the housing and the brushless motor to communicate with the suction port and the exhaust port. A fan may be provided inside the air passage to flow the cooling air therethrough.

By such a configuration, since the cooling air is taken in through the suction port at any time, the atmosphere around the suction port can be made equivalent to the outside air at any time. Thereby, the cooling performance from the heat radiating surface is enhanced, and the cooling can be made stably.

The heat radiating surface of the electric circuit may be disposed inside the air passage and at a position where the heat radiating surface is directly exposed to the cooling air.

By such a configuration, the cooling air flown inside the air passage is directly applied on the heat radiating surface. Thereby, the cooling performance on the heat radiating surface is enhanced, and the cooling can be made more suitably.

The electric circuit may include: a switching element; and a heat radiating portion that is integrally provided with the switching element on one side thereof. The switching element may be disposed so that the most part thereof is exposed to the cooling air.

By such a configuration, the switching element is projected without contacting with other members, and prevented from undergoing an external force such as an urging force from other members. Hence, an excessive load is suppressed on the connection part between the electric circuit and the board.

BEST MODE FOR CARRYING OUT THE INVENTION

Figure 1:
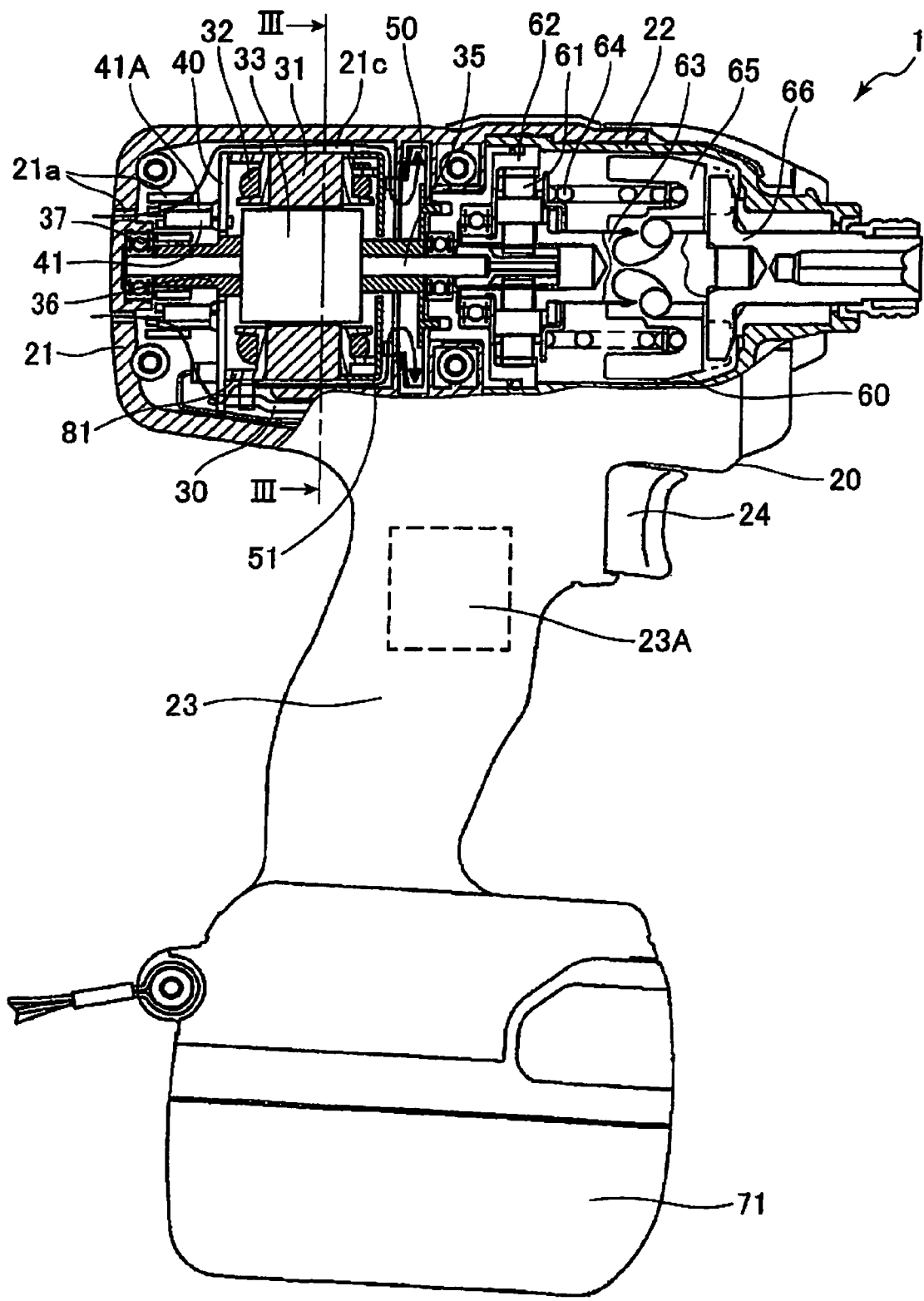
FIG. 1 is a cross-sectional view of an impact driver according to an embodiment of the present invention.

A power tool according to an embodiment of the present invention will be described below with reference to FIGS. 1 to 4. An impact driver 1 that is the power tool as shown in FIG. 1 is mainly composed of a housing 20, a motor 30, a circuit board 40, and a power transmission device 60.

The housing 20 is composed of a motor housing portion 21, a power transmission housing portion 22, and a handle housing portion 23. In this embodiment, a forward direction is defined as the direction from the motor housing portion 21 to the power transmission housing portion 22, and a backward direction is defined as the opposite direction. A downward direction is defined as the direction, orthogonal to this longitudinal direction, along which the handle housing portion 23 extends.

Figure 2:
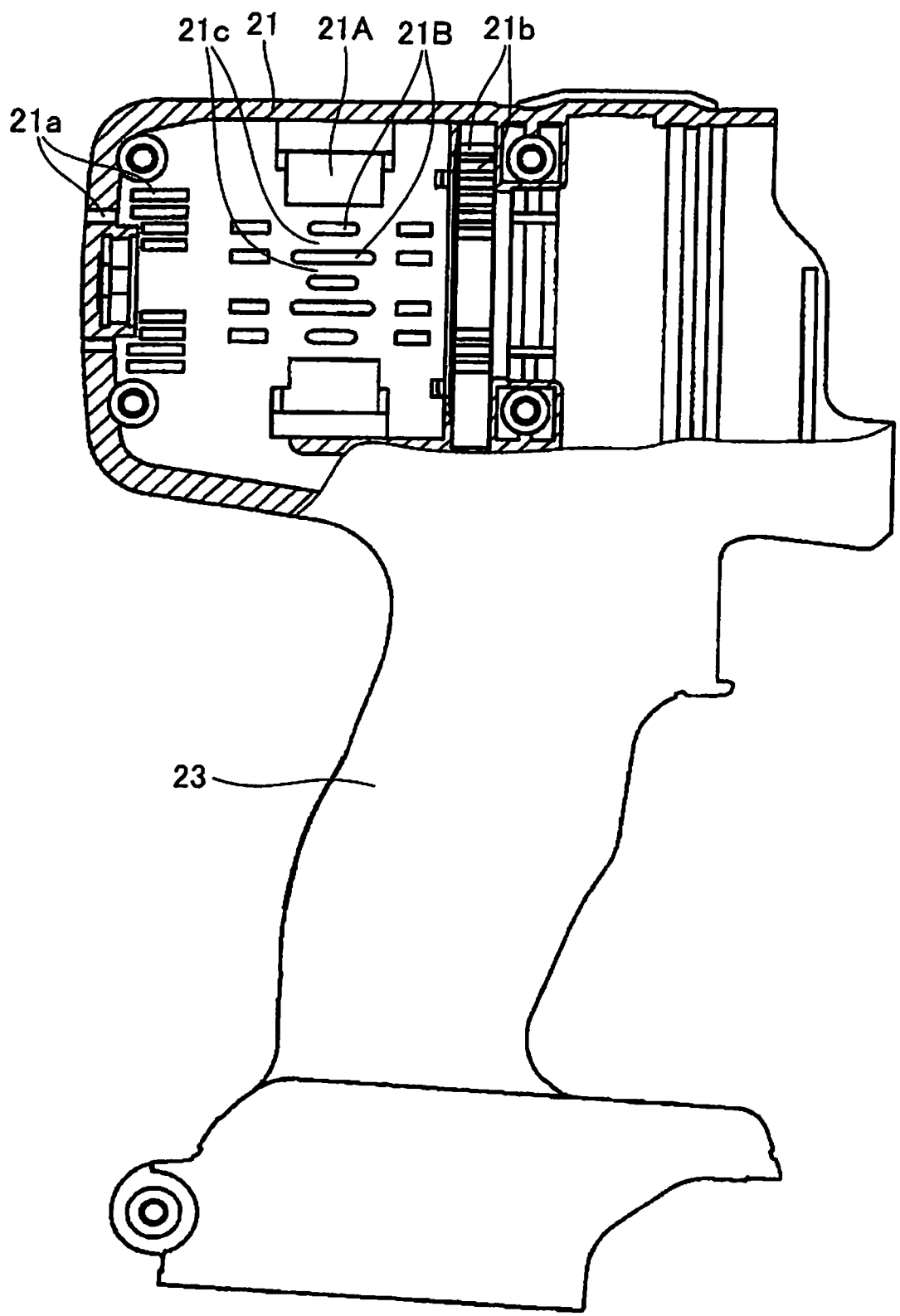
FIG. 2 is a side view showing the inner surface of a motor housing portion for the impact driver according to the embodiment.
Figure 3:
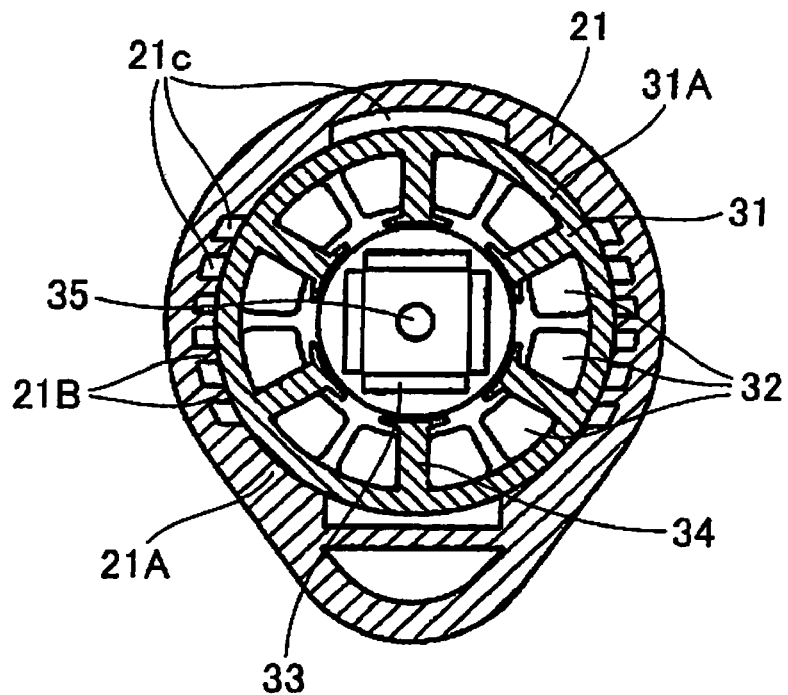
FIG. 3 is a cross-sectional view taken along the line III-III of FIG. 1.

The motor housing portion 21 has a cylindrical shape, and accommodates the motor 30 and the circuit board 40. An air inflow hole 21a for permitting the air to flow from outside the housing 20 is formed at an axial position behind the motor housing portion 21 and around the extension of a rotation shaft 35. As shown in FIG. 2, an air exhaust hole 21b for exhausting the air to the outside is formed in the front of the motor housing portion 21, and a planar holding portion 21A and a bar-like holding portion 21B that are holding members for holding the motor 30 are provided in the central part. The bar-like holding portion 21B has a rib structure of plural ribs having different sizes. An air passage 21c is set between the ribs. The air passage 21c is demarcated between the outside of the motor 30 and the motor housing portion 21, as shown in FIG. 3, and communicates between the air inflow hole 21a and the air exhaust hole 21b, as shown in FIG. 2.

The power transmission housing portion 22, which is shaped like a cylinder, is disposed in the front of the motor housing portion 21, and accommodates the power transmission device 60 inside the cylinder. Also, the head of an anvil 66 projects out of the top end of the power transmission housing portion 22.

The handle housing portion 23 extends downward from the motor housing portion 21 and the power transmission housing portion 22. A trigger switch 24 is provided on a base end portion of the handle housing portion 23. A battery pack case 71 for storing a battery pack containing a lithium ion secondary battery or nickel cadmium secondary battery, not shown, is removably mounted on the lower end of the handle housing portion 23. Also, a wiring and motor drive circuit 23A, not shown, for supplying electric power from the battery pack, not shown, to the motor 30 is accommodated within the handle housing portion 23. If the battery pack case 71 is mounted on the handle housing portion 23, the battery pack, not shown, and the motor drive circuit 23A are electrically connected via the trigger switch 24.

The motor 30 is a brushless motor mainly composed of a stator 31, a coil 32 and a rotor 33. As shown in FIG. 3, the stator 31 has a cylinder portion 31A, and a plurality of teeth 34 projecting inward radially from the inner circumferential surface of the cylinder portion 31A and extending in the axial direction of the cylinder portion 31A. The insulating member 81 (FIG. 1), electrically isolated, are attached on the teeth 34 from both ends in the direction of rotation shaft. The stator 31 is supported on the motor housing portion 21 by the cylinder portion 31A.

The coil 32 is wound in order around the plural teeth 34 to make up an three-phase coil in the star connection.

The rotor 33 is press-fitted coaxially via a sleeve 36 into the rotation shaft 35 with both ends rotatably borne on a bearing 37 supported by the motor housing portion 21 and can be rotated along with the rotation shaft 35.

Figure 4:
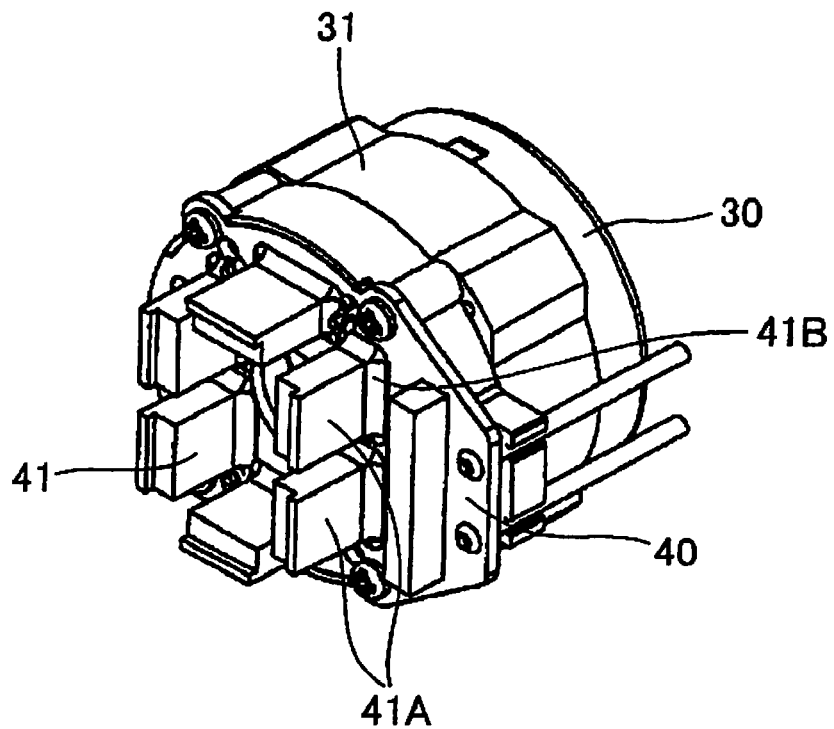
FIG. 4 is a partial perspective view showing a state of the rear side of a motor for the impact driver according to the embodiment.

The circuit board 40 is fixed to an end face of an insulating member 81 located on the side of the air inflow hole 21a. The circuit board 40 is an inverter circuit electrically connected with the coil 32 and composed of a known bridge circuit, and includes six IGBTs (output transistors) 41 disposed on the rear end of the rotation shaft 35. These. IGBTs (output transistors) 41 integrally have a heat radiating plate 41A with a heat radiating surface for cooling, because they are connected to the coil 32 to flow a large current. The IGBTs (output transistors) 41 are arranged in order around the axis of the rotation shaft 35 and with the heat radiating plate 41A on the outer circumferential side, as shown in FIG. 4. The IGBTs (output transistors) 41 are disposed at the position in the neighborhood of the air inflow hole 21a with the heat radiating surface of the heat radiating plate 41A located on the air passage 21c, as shown in FIG. 1. Thereby, the atmosphere around the heat radiating plate 41A is almost equivalent to the outside air, and the heat radiating plate 41A contacts the air current flowing through the air passage 21c generated by a fan 50, enhancing the cooling performance.

Since each of the six IGBTs (output transistors) 41 has the heat radiating plate 41A, there is no need for mounting the additional heat radiating plate outside, and the entire surface is exposed. Hence, an outside force such as an urging force from the other member is prevented, and an excessive load on a leg 41B (FIG. 4) that is the connection part with the circuit board 40 is suppressed.

Also, the fan 50 is secured to be coaxially rotatable via the sleeve 36 within the air passage 21c of the motor housing portion 21 in the front of the rotation shaft 35. If the motor 30 is driven, the fan 50 is rotated integrally with the rotation shaft 35 to generate the air current within the air passage 21c, suck the outside air through the air inflow hole 21a, and exhaust the air though the air exhaust hole 21b (FIG. 2) to the outside.

The power transmission device 60 includes a reduction gear portion stored within the power transmission housing portion 22 and composed of a planetary gear 61 and a ring gear 62, an impact mechanism portion composed of a spindle 63 and a hammer 65, and the anvil 66 capable of holding a tipped tool (not shown).

The planetary gear 61 and the ring gear 62, which are connected to the rotation shaft 35 of the motor 30, reduce and transmit the rotation to the spindle 63. The spindle 63 is disposed in the front of and connected to the planetary gear 61 and the ring gear 62, and the reduced rotation of the rotation shaft 35 is transmitted to the spindle 63. The hammer 65 is placed longitudinally slidably on the spindle 63, and urged by a spring 64 disposed behind it to exert an impact force with the spring 64. The anvil 66 is attached coaxially rotatably at the head of the spindle 63, and the hammer 65 makes contact with its rear end portion to give rise to the impact force.

Also, the hammer 65 and the anvil 66 are provided with a convex portion and a concave portion, not shown, respectively. If a predetermined load is not applied on the anvil 66, the convex portion of the hammer 65 and the concave portion of the anvil 66 are fitted together, so that the hammer 65 and the anvil 66 are rotated integrally to obtain a torque. On the other hand, if a predetermined load or more is applied on the anvil 66, the anvil 66 is locked and not rotated, whereby the convex portion of the hammer 65 and the concave portion of the anvil 66 are disengaged, so that the hammer 65 advances under the action of the spring 64 to obtain an impact force.

When the impact driver 1 with the above constitution is employed, the user pulls the trigger switch 24 to supply electric power from a battery, not shown, within the battery pack case 71 via the motor drive circuit 23A and the IGBTs (output transistors) 41 to the motor 30, so that the rotation shaft 35 is rotated to exert a rotational impact on the anvil 66. At this time, the fan 50 attached coaxially rotatably on the rotation shaft 35 generates a flow of air current within the air passage 21c, and this flow of air current cools the heat radiating plate 41A and cools the IGBTs (output transistors) 41 suitably. Also, to directly cool the heat radiating plate 41A, it is unnecessary to attach a cooling plate of another member. Hence, the number of components making up the impact driver 1 can be reduced, and the work efficiency for manufacturing of the impact driver 1 is improved.

This application claims priority from Japanese Patent Application No. 2007-159734 filed on Jun. 18, 2007, the entire contents of which are incorporated herein by reference.

INDUSTRIAL APPLICABILITY

According to an aspect of the present invention, it is possible to secure the cooling performance for the power tool without providing the individual heat radiating member.

The invention claimed is:
1. A power tool comprising:
a housing having an air inflow port for permitting a cooling air to flow into the housing and an exhaust port for exhausting the air to an outside of the housing;
a brushless motor accommodated in the housing and having a rotor supported on a rotation shaft and rotatable within a stator;
an air flow passage communicating the air inflow port and the exhaust port;
a circuit board disposed at a position adjacent to an end face of the brushless motor;
an electric circuit formed on the circuit board and including a switching element to control the brushless motor; and
a heat radiating plate having a heat radiating surface for cooling the switching element; wherein the switching element is disposed at a position around an extension of the rotation shaft and the heat radiating plate is integrally disposed on an outer circumferential side surface of the switching element.

2. The power tool according to claim 1, wherein the heat radiating plate is disposed in the air flow inside in the air flow passage and at a position where the heat radiating surface is directly exposed to the cooling air.

3. The power tool according to claim 1, wherein the heat radiating plate is disposed so that the heat radiating surface thereof is exposed to the cooling air.

4. The power tool according to claim 1, wherein the heat radiating plate is disposed so that the heat radiating surface thereof faces the air inflow port.

5. The power tool as defined in claim 1, wherein the air inflow port is formed in a motor housing portion at a position around the heat radiating surface.

6. The power tool as defined in claim 5, wherein the exhaust port is formed in the front of the motor housing portion.

7. The power tool as defined in claim 6, wherein a plurality of ribs are formed on an inner surface of a central part of the motor housing so that the air flow passage is formed between the ribs.

8. The power tool as defined in claim 1, wherein the circuit board is fixed to an insulating member located on the side of the air flow port.

9. The power tool as defined in claim 1, wherein the electric circuit is an inverter electrically connected to coils of the stator.

10. The power tool as defined in claim 1, wherein the electric circuit includes a plurality of transistors formed on the circuit board, wherein the circuit board is disposed extending in a direction substantially perpendicular to the rotation shaft, the transistors being located at a position around the extension of the rotation shaft and adjacent to the air inflow port, and wherein the heat radiating plate is disposed substantially perpendicular to the circuit board.

11. The power tool as defined in claim 10, wherein each of the transistors is provided with a heat radiating plate.

12. The power tool as defined in claim 1, wherein a fan is secured to the rotation shaft to generate an air flow in the air flow passage.

* * * * *